April 21, 1931.                C. W. ROBINSON                    1,801,979
                                ROTARY ROD WEEDER
                              Filed Oct. 8, 1927            3 Sheets-Sheet 1
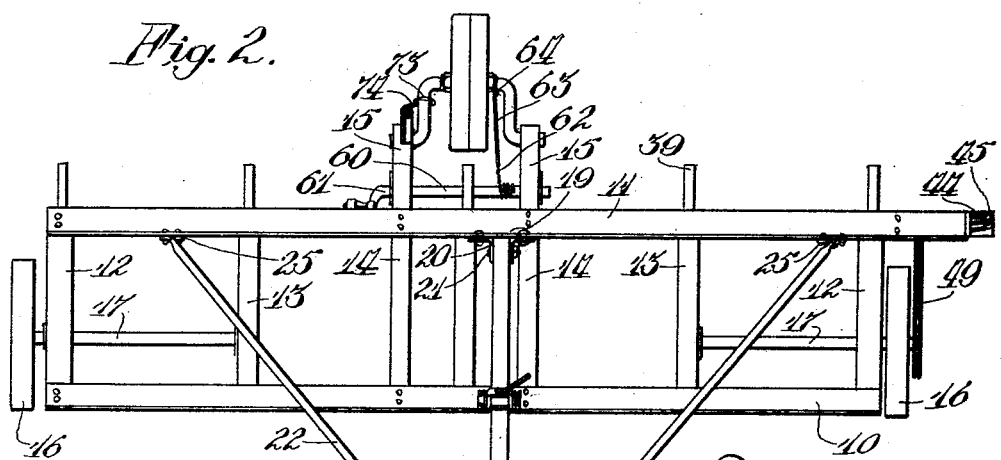
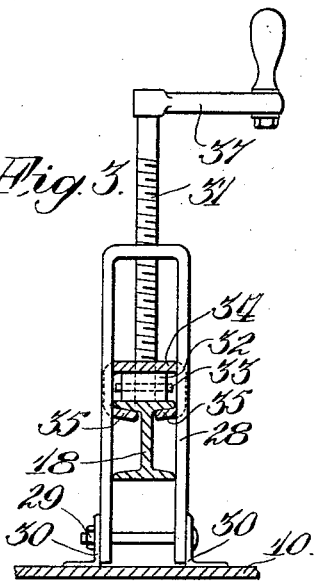
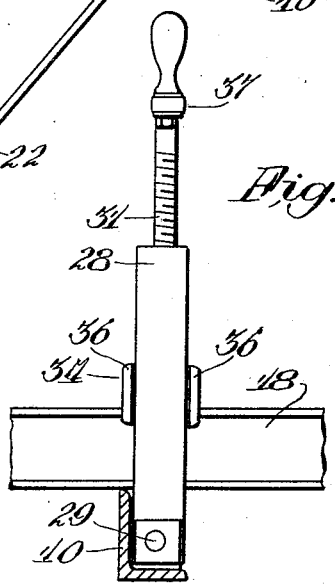

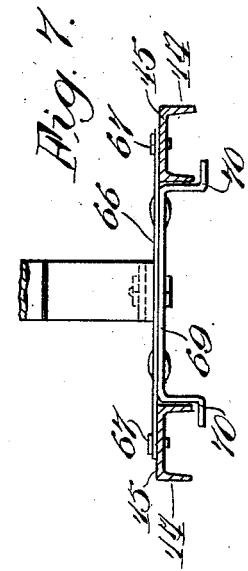
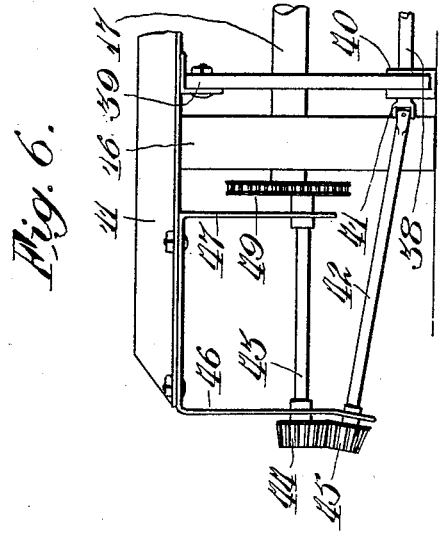
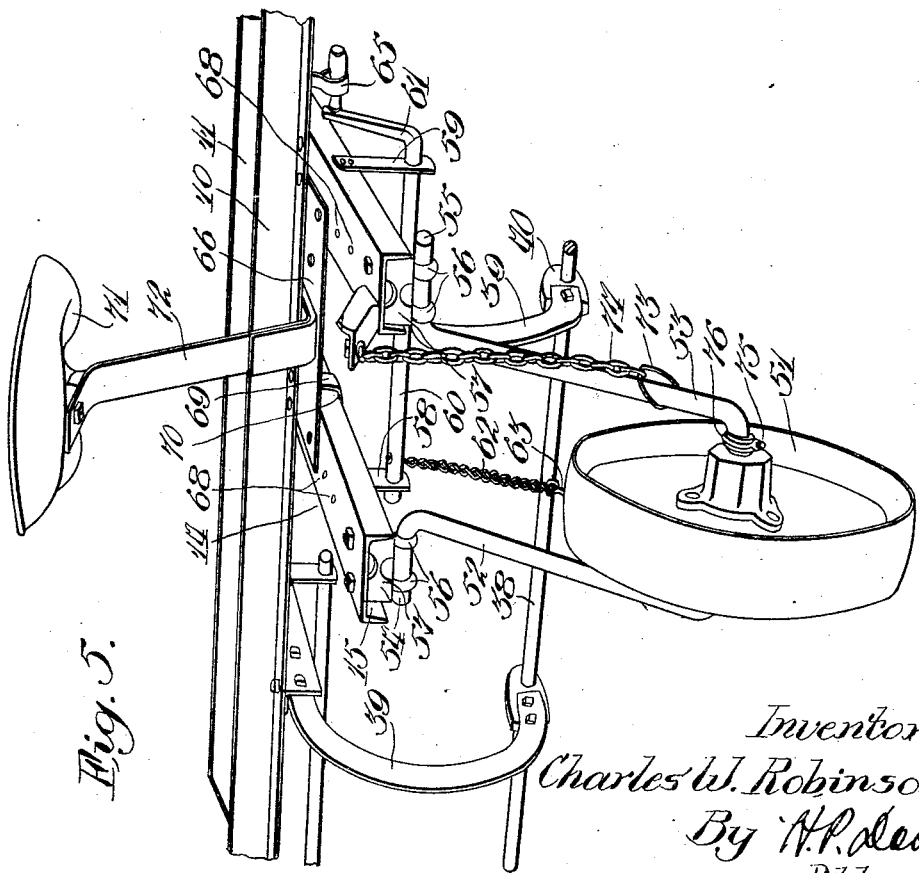

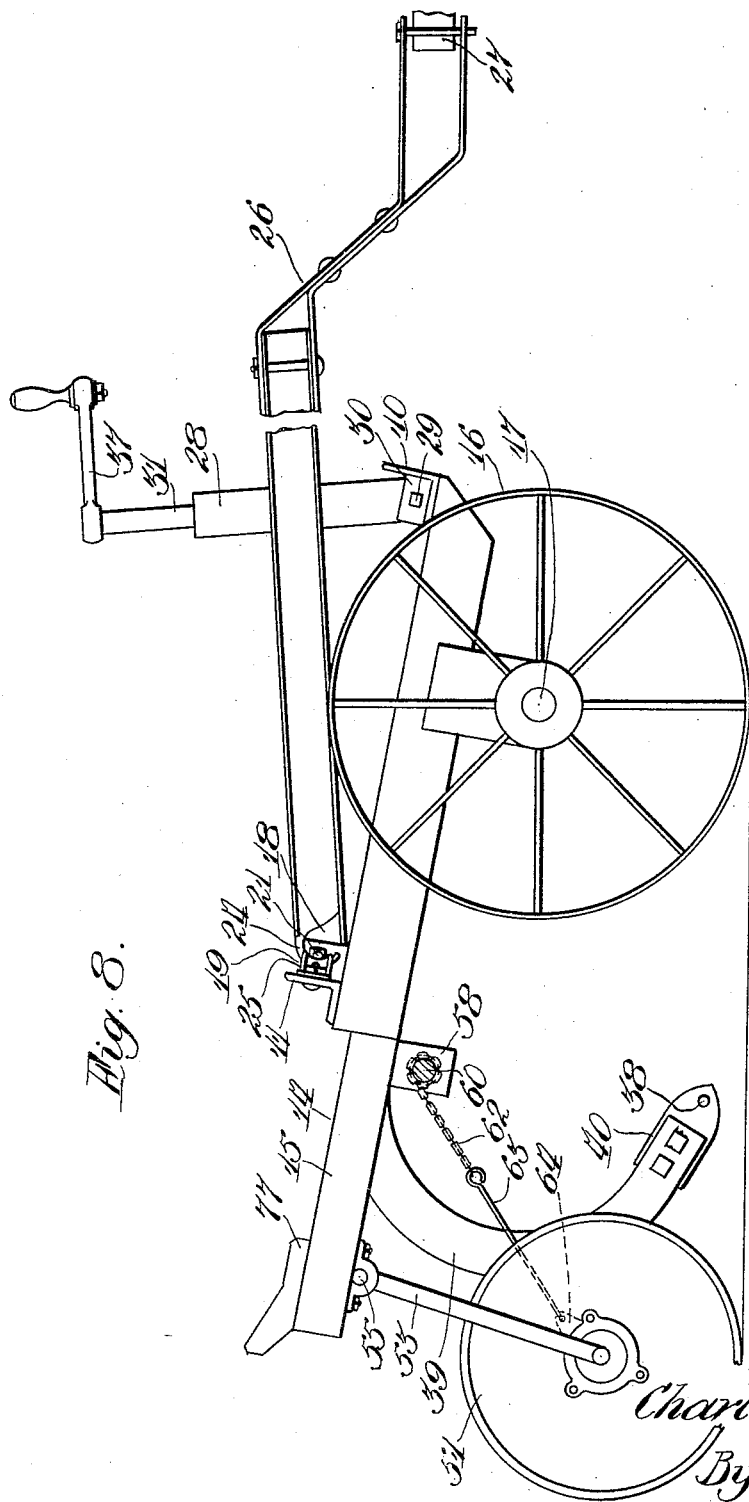

Patented Apr. 21, 1931

1,801,979

UNITED STATES PATENT OFFICE

CHARLES W. ROBINSON, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY

ROTARY ROD WEEDER

Application filed October 8, 1927. Serial No. 224,832.

This invention relates to rotary rod weeders, and more particularly to a novel construction capable of advantageous use with tractors.

An object of the invention is to provide a practical and successful rotary rod weeder of such novel construction that its operation may be advantageously controlled when the machine is pulled by a tractor.

Another object of the invention is to provide a rotary rod weeder having novel mechanism for maintaining the machine in operative condition.

Further objects of the invention will appear as the following description proceeds.

An illustrative embodiment of the invention is shown in the accompanying drawings, in which:

Figure 1 is a side elevation of the rotary rod weeder;

Figure 2 is a plan;

Figure 3 is a transverse vertical view, partly in section and partly in elevation, showing the adjusting mechanism for governing the operation of the machine;

Figure 4 is a longitudinal or side elevational view of the structure shown in Figure 3;

Figure 5 is a rear perspective view of the machine;

Figure 6 is a detail elevation of one end of the machine showing parts of the driving mechanism;

Figure 7 is a view, partly in vertical section and partly in elevation, showing the structure by which the operator's seat is adjustably moved upon the machine for the purpose of balancing and for the purpose of controlling the operation of the rotary rod; and Figure 8 is an enlarged elevation showing parts of the controlling mechanism in section.

The illustrative rod weeder comprises a wheel supported frame made up of the transverse frame members 10 and 11 rigidly connected by longitudinal frame members 12 and 13. Intermediate the longitudinal members 13 are beams 14, also rigidly connected to the members 10 and 11 and having rearward extensions 15, as clearly indicated in Figure 2 of the drawings. This rigid frame is carried by supporting wheels 16 mounted upon axles 17 rotatably journaled beneath the longitudinal members 12 and 13.

For the purpose of propelling the above described wheel supported frame, a draft frame is applied thereto. In the drawings this draft frame comprises the central member 18 extending over the front transverse member 10 and pivoted to the rear transverse member 11 at 19 by means of brackets 20 and a pivot pin 21, as illustrated in the drawings. Side members 22 are secured to the forward end of the central member 18 as indicated at 23 in Figure 1. These side members preferably diverge rearwardly and have down-turned, rod-like ends 24 loosely and pivotally mounted in brackets 25 secured to the rear transverse member 11, as shown in Figures 1 and 2 of the drawings.

For the purpose of affording a relatively fixed support from which the machine may be controlled, a rigid draft hitch 26 is fixed to the forward end of the draft frame, as indicated in Figures 1 and 8 of the drawings. This draft structure has its forward end offset downwardly to a position where it is secured to a tractor drawbar at 27. This drawbar thus affords a relatively fixed support from which the operation of the machine and the depth of penetration of the rotary rod may be adequately controlled.

For the purpose of accomplishing the controlling of the machine as above referred to a governing or controlling means is applied to the draft frame intermediate its ends, as indicated in Figures 1 and 8 of the drawings. This governing or controlling means includes a yoke 28 pivotally mounted upon a pivot pin 29 held in place by the brackets 30, which are secured to the front transverse frame member 10. The central member 18 of the draft frame extends between the sides of the yoke, as clearly indicated in Figure 3 of the drawings. The upper end of the yoke is screw-threaded to receive a screw-threaded adjusting rod 31. This rod is mounted in upright position extending down through the yoke and having a head 32 fixed upon its lower end by a pin 33. The head 32 is confined so that it must remain in substantial engagement with the upper surface of the member 18. This is accomplished by a secondary yoke or guide member 34, which is preferably bored to receive the adjusting screw 31. The lower ends 35 of the guide 34 are bent inwardly underneath the flange of the central member 18, as clearly indicated by Figure 3 of the drawings. The part of the guide member 34 between the upright parts of the yoke 28 is in the form of a plate. This plate has extensions 36 extending outwardly so as to straddle the sides of the yoke 28. Mounted upon the upper end of the shaft or rod 31 is a hand crank 37, the turning of which will so tilt the wheel supported frame that the entire weight of that frame may bear upon the rotary rod 38.

For rigidly holding the rotary rod 38 in position, plow beams or goose-neck standards 39 are rigidly secured to the frame. The rotary rod is journaled in plow points 40 fixedly secured to the lower ends of the standards 39. At one end the rotary rod is provided with a universal joint 41 for connecting the rod to an intermediate shaft 42. This shaft is driven from counter-shaft 43 by means of gears 44 and 45. The outer end of the shaft 42 as well as both ends of the shaft 43 are journaled in the depending legs 46 and 47 of a support rigidly secured to a side extension of the frame member 11, as clearly shown in Figure 6 of the drawings. The inner end of the shaft 43 has a sprocket wheel 48 fixed thereon. This shaft is driven by a sprocket chain 49 which is trained around a driving sprocket 50 non-rotatively mounted upon one of the axles 17.

Means is provided underneath the extensions 15 for elevating the rotary rod 38 to its inoperative position indicated in Figure 8 of the drawings. This includes a supporting wheel 51 journaled upon the mid-portion of a yoke or bail having the upwardly extending arms 52 and 53. At their upper ends the arms 52 and 53 are bent at right angles to form the pivot members 54 and 55. These members are rotatively mounted in journals 56 rigidly secured to the extensions 15 and spaced beneath said extensions by the blocks 57.

Rotatively journaled in depending brackets 58 and 59 is a winding shaft 60 having a hand crank 61 at its outer end. Such a flexible element as a chain 62 is secured to the shaft 60 so that it may be wound thereon. A link 63 connects the chain 62 to a plate 64 anchored to the support for the wheel 51. In Figure 1 of the drawings the wheel 51 is shown in its rearward position, allowing the rotary rod 38 to operate beneath the surface of the soil. When it is desired to bring the rod to inoperative position, the shaft 60 is rotated in a clock-wise direction by the crank 61. This action winds up the chain 62 on the shaft 60 and brings the wheel 51 forward, bringing the parts to the position indicated in Figure 8 of the drawings and thus raising the rotary rod to its inoperative position. The crank 61 may be secured by any suitable retaining means 65.

The operation of the machine and the uniformity of the work done by the rotary rod is affected by the position at which the weight of the operator is exerted upon the frame. The farther rearwardly the operator is placed upon the frame, the greater is the effect to hold the rotary rod down to its work. Under certain conditions, it is desirable to have the machine work with varying effects, and, to meet these conditions as well as to vary the resistance which the rotary rod opposes to ground forces, means are provided for facilitating the placing of the driver at different positions along the extensions 15. The illustrative means for accomplishing this purpose includes a transverse plate 66 extending transversely of the extension 15 and over the tops thereof. This plate has short downwardly extending lugs 67 fixed near its ends and adapted to extend into any pair of a series of holes 68 in the respective extensions 15. In order to prevent the plate 66 from being accidentally moved from its operative position after it has been adjusted and to allow for a convenient adjustment of the plate along the extensions 15, the former is provided with a retainer 69, herein shown as a bar flexibly secured to the plate and having lugs 70 extending outwardly underneath the extensions 15. The lugs 70 are sufficiently spaced from the lower surfaces of the extensions 15 so as to allow the tipping of the plate 66 forwardly enough to free the pins 67 from the holes in the extensions 15. When this is done the entire seat supporting structure may be moved along and dropped into other holes in the extensions. An operator's seat 71 is secured in a convenient position upon the plate 66 by means of a bar 72.

When the machine is in operation, it is advantageous at times to maintain the wheel 51 in elevated position so that it is entirely clear of the ground. This may be done through the lifting of the arms 52 and 53 so that the ring 73 on chain 74 can be hooked around the set screw 75 securing the stop collar 76 to the mid-portion of the pivotal support for the wheel 51. The chain 74 is secured at its upper end to a bracket 77 extending rearwardly of the frame and fixed thereto, as clearly shown in the drawings. When the parts are positioned as shown in Figure 5 of the drawings, the chain 74 will operate to prevent undue movement of the support for the wheel 51.

While the invention has been described with reference to a particular machine, it is to be understood that it is not limited thereto but is of a scope commensurate with the scope of the appended claims.

What is claimed is:

1. In a rotary rod weeder, the combination of a wheel supported frame, a rotary rod mounted in fixed position thereon, a draft frame pivotally connected to the wheel supported frame and extending forwardly therefrom, and means for adjusting the relative angular positions of the frames thereby elevating and lowering the rotary rod.

2. A rotary rod weeder comprising, in combination, a rotary weeding rod, a wheel supported frame carrying the rod in fixed position, a forwardly extending draft frame pivoted to the wheel supported frame and adapted to have its forward end supported by a tractor at a fixed elevation, and manually operable means engaging the frames for adjusting the angular relation of the frames to vary the ground penetration of the rotary rod.

3. A rotary rod weeder having a main frame, a draft frame pivotally connected at its rear end to the main frame and overlapping said frame, a tractor hitch at the forward end of the draft frame, and a pressure regulator adjustably connecting the main frame and the draft frame intermediate the ends of the latter.

4. In a rotary rod weeder, a wheel supported frame, a rotary weeding rod carried by said frame, a draft frame pivotally connected to the wheel supported frame at a substantial distance from the front of the latter and extending forwardly therefrom, means at the forward end of the draft frame for attachment to the drawbar of a tractor, and manually operable means intermediate the ends of the draft frame for controlling the position of said rotary rod, said manually operable means being capable of so lifting the forward end of the wheel supported frame that its entire weight will be carried by the rotary rod.

5. A rotary rod weeder comprising, in combination, a wheel supported frame, a rotary weeding rod carried by said frame, a draft frame extending forwardly of the wheel supported frame and pivotally connected thereto at a position substantially removed from the front of said wheel supported frame, means at the forward end of the draft frame for attachment to the drawbar of a tractor, and a manually operable pressure regulator connecting the forward end of the wheel supported frame and the draft frame, said pressure regulator being capable of increasing the distance between the forward end of the wheel supported frame and the draft frame for raising the rotary rod from the ground.

6. A rotary rod weeder comprising, in combination, a frame, a rotary weeding rod carried by said frame, means carried by said frame for transmitting rotary movement to said rod, a ground wheel at the rear of said frame and located rearwardly of said rotary rod, a ground wheel support pivotally mounted on the rearward portion of said frame, a winding shaft journaled on said frame, means connecting said winding shaft and said pivotal support, means for turning said winding shaft to wind up said connecting means thereon and elevate the rearward portion of said frame by pulling said ground wheel forwardly, and means connecting said pivotal support and frame and adapted to maintain the ground wheel out of contact with the ground.

In testimony whereof I affix my signature.

CHARLES W. ROBINSON.